United States Patent Office 3,819,642
Patented June 25, 1974

3,819,642
2-(5-NITRO-2-THIAZOLYL)-BENZIMIDAZOLES
Peter Strehlke and Ulrich Redmann, Berlin, Germany, assignors to Schering Aktiengesellschaft, Berlin and Bergkamen, Germany
No Drawing. Filed June 23, 1972, Ser. No. 265,468
Claims priority, application Germany, Aug. 20, 1971,
P 21 42 585.4
Int. Cl. C07d 99/10
U.S. Cl. 260—302 H        21 Claims

ABSTRACT OF THE DISCLOSURE

This invention relates to 2 - (5-nitro-2-thiazolyl)-benzimidazoles of the formula

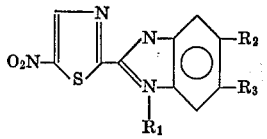

wherein $R_1$ is hydrogen; alkyl; phenyl, benzyl; 2-phenylethyl; hydroxyalkyl; esterified hydroxyalkyl; or

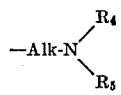

wherein Alk is alkylene and $R_4$ and $R_5$ are alkyl; and $R_2$ and $R_3$ are each hydrogen, halogen, alkyl, alkoxy, trifluoromethyl or nitro. These compounds are useful fungicides.

BACKGROUND OF THE INVENTION

Field of the invention

This invention relates to 2-(5-nitro-2-thiazolyl)-benzimidazoles and to processes for their preparation and use.

Description of the prior art

Benzimidazoles containing a five-membered heterocyclic ring having a nitro group in the 2-position are known effective antibacterial agents against bacteria and protozoa, as reported in German Pat. 1,138,058, and J. Med. Chem., 9, 751 and 788 (1966). However, these prior art compounds were not known to exhibit useful fungicidal activity. For example, 2-(5-nitro-2-furyl)-benzimidazole, described in J. Med. Chem., 9, 788 (1966) is effective, in vitro, against Staphylococcus aureus and Trichomonas genera, but is relatively ineffective against Candida albicans and dermatophytes.

OBJECTS OF THE INVENTION

A principal object of this invention is to provide novel 2-(5-nitro-2-thiazolyl)-benzimidazoles which exhibit pronounced antifungal properties.

Another object of this invention is to provide a process for preparing 2-(5-nitro-2-thiazolyl)-benzimidazoles.

A further object of this invention is to provide fungicidal compounds and compositions and methods for their use.

An additional object of this invention is to provide antibacterial compounds and compositions and methods for their use.

Upon further study of the specification and claims, further objects and advantages of this invention will become apparent to those skilled in the art.

SUMMARY OF THE INVENTION

The above and other objects are attained in one aspect of this invention by providing 2-(5-nitro - 2 - thiazolyl)-benzimidazoles of the formula

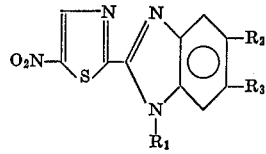

wherein $R_1$ is hydrogen; alkyl; phenyl; benzyl; 2-phenylethyl; hydroxyalkyl; esterified hydroxyalkyl; or

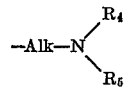

wherein Alk is alkylene and $R_4$ and $R_5$ are alkyl; and $R_2$ and $R_3$ are each hydrogen, halogen, alkyl, alkoxy, trifluoromethyl or nitro.

DETAILED DISCUSSION

It will be appreciated that modification within the scope of this invention can be made in the above formula, e.g., by adding known substituents or increasing the number of carbon atoms, provided that such alterations do not adversely affect the desired properties in the resultant compound. Presently preferred compounds of this invention are those of the above formula in which:

(a) At least one of $R_2$ and $R_3$ is hydrogen; chlorine; alkyl of 1–5 carbon atoms, especially methyl; alkoxy of 1–5 carbon atoms, especially methoxy; or trifluoromethyl;

(b) $R_1$ is hydrogen and at least one of $R_2$ and $R_3$ is hydrogen; chlorine; alkyl of 1–5 carbon atoms, especially methyl; alkoxy of 1–5 carbon atoms, especially methoxy; or trifluoromethyl;

(c) $R_1$ is hydrogen and $R_2$ and $R_3$ are each hydrogen, methyl, methoxy, or chlorine;

(d) $R_1$ is hydrogen, alkyl of 1–5 carbon atoms; phenyl, benzyl, 2-phenyl ethyl, hydroxyalkyl of 2–5 carbon atoms; or

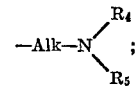

(e) $R_1$ is hydrogen, alkyl of 1–5 carbon atoms; phenyl, benzyl, 2-phenyl ethyl, hydroxyalkyl of 2–5 carbon atoms; or

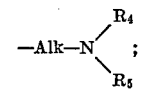

and $R_2$ and $R_3$ are hydrogen; chlorine; alkyl of 1–5 carbon atoms, especially methyl; alkoxy of 1–5 carbon atoms, especially methoxy; or trifluoromethyl;

(f) Compounds of the above formula wherein $R_1$ is

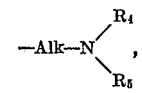

including the salts of these compounds with physiologically compatible acids, e.g., with hydrochloric acid, sulfuric acid, phosphoric acid, acetic acid, tartaric acid, or benzoic acid;

(g) $R_1$ is hydroxyalkyl of 2–5 carbon atoms esterified with lower alkanoyl of 1–5 carbon atoms.

Compounds of this invention, in addition to those shown in the examples, include:

2-(5-nitro-2-thiazolyl)-5-nitro-benzimidazole
1-methyl-2-(5-nitro-2-thiazolyl)-5-nitro-benzimidazole 1-phenyl-2-(5-nitro-2-thiazolyl)-5-nitro-benzimidazole
2-(5-nitro-2-thiazolyl)-5,6-dinitro-benzimidazole
1-(2-acetoxyethyl)-2-(5-nitro-2-thiazolyl)-benzimidazole
1-(5-pentanoyloxy-pentyl)-2-(5-nitro-2-thiazolyl)-5-chloro-benzimidazole.

The compounds of this invention can be prepared, e.g.,
(a) By reacting a diamine of the formula

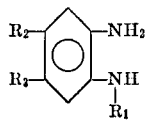

wherein $R_1$, $R_2$, and $R_3$ have the above-indicated meanings, with 5-nitrothiazole-2-carboxylic acid or with an activated functional derivative thereof; or (b) By reacting a diamine of the above formula with 5-nitrothiazole-2-aldehyde and oxidizing the resultant reaction product.

The diamine starting materials can be prepared by methods described in: Houben-Weyl, Methoden der Organischen Chemie XI, 1, Georg Thieme Varlag, Stuttgart (1957); some special compounds are described in Chim. Therap. *1971*, 286.

The reaction according to (a) can be conducted with or without an inert solvent, e.g., alcoholic hydrochloric acid, at about 0–100° C., preferably at reflux temperatures. Suitable activated functional derivatives of 5-nitrothiazole-2-carboxylic acid are carboxylic acid derivatives which are more reactive towards ring formation than the free acid; of these, compounds having carbon-nitrogen unsaturation, i.e., the iminocarboxylic acid esters and the nitrile are preferred; especially preferred is the ethyl ester of the carboximidic acid or its hydrochloride.

The reaction can be conducted using stoichiometric amounts of the two reactants, but preferably a slight stoichiometric excess of the diamine is used to assure a good yield. The reaction is preferably carried out in an inert diluent; suitable inert diluents include but are not limited to alkyl alcohols, e.g., methanol, ethanol, etc.; acidified alkyl alcohols, preferably acidified with an inorganic acid, e.g., HCl or $H_2SO_4$; ethers, e.g., ethyl ether, tetrahydrofuran, dioxane; halogenated aliphatic hydrocarbons, e.g., dichloromethane, chloroform, 1,2-dichloroethane; hydrocarbons, e.g., benzene or toluene.

The resultant reaction product can be recovered and purified by conventional techniques, e.g., vacuum filtration and extraction.

The reaction according to (b) is effected at about 0–100° C. with the simultaneous or subsequent use of an oxidizing agent, e.g., atmospheric oxygen, mercury (II) oxide, lead tetraacetate, or nitrobenzene. The 5-nitrothiazole-2-aldehyde can be prepared by methods described in J. Med. Chem., *12*, 371 (1969).

The reaction according to scheme (b) can be conducted under the same reaction conditions suitable for scheme (a). The oxidizing agent is added in an amount of 1 to 3 moles per mole of reduced reaction product.

The starting materials used in the above processes according to (a), i.e., 5-nitrothiazole-2-carboxylic acid and activated derivatives thereof, can be prepared from 2-cyano-5-nitrothiazole described in J. Med. Chem., *12*, 303 (1969), by partially hydrolyzing 2-cyano-5-nitrothiazole to the 5-nitrothiazole-2-carboxylic acid amide. The amide can then be decomposed to 5-nitrothiazole-2-carboxylic acid.

The partial hydrolysis of 2-cyano-5-nitrothiazole to the 5-nitrothiazole-2-carboxylic acid amide can be accomplished by treatment with an inorganic acid, preferably hydrochloric or sulfuric acid, at room temperature or elevated temperature. Generally, the hydrolyzing amount of acid required will be 0.01 to 50 moles, preferably 1 to 10 moles of acid per mole of 2-cyano-5-nitrothiazole.

The decomposition of the 5-nitrothiazole-2-carboxylic acid amide is effected by reaction with nitrous acid, or the anhydride or alkyl esters thereof, in an aqueous or non-aqueous inert diluent, preferably by reacting the amide with an alkali nitrite in aqueous inorganic acid.

The preparation of the ethylester of 5-nitrothiazole-2-carboximidic acid is described in J. Med. Chem., *12*, 303 (1969). The hydrochloride of the latter compound is prepared by saturation of an etheral solution of equimolecular amounts of 2-cyano-5-nitrothiazole and ethanol with HCl. Instead of ethanol every other primary aliphatic alcohols can be used yielding the corresponding ester of the carboximidic acid as its hydrochloride.

The compounds of this invention exhibit a pronounced antimicrobial effect, specifically against yeast, e.g., *Candida albicans* and fungi, e.g., the dermatophytes, *Trichophyton mentagrophytes* and *Trichophyton rubrum*. Moreover, these compounds are effective antibacterial agents against *Staphylococcus aureus*, *Mycobacterium tuberculosis*, and *Trichomonas vaginalis*. Table I sets forth the MIC (minimum inhibitory concentration) of several compounds of this invention, determined using the serial dilution technique.

TABLE I

| In Formula I | | | MIC (μg./ml.) against— | | |
| --- | --- | --- | --- | --- | --- |
| $R_1$ | $R_2$ | $R_3$ | Cand. alb. | Trich. ment. | Trich. rubr. |
| H | H | H | 3.1 | 6.3 | 1.6 |
| H | CH$_3$ | H | 1.6 | -------- | 25 |
| H | Cl | H | 0.8 | 1.6 | 0.8 |
| 2-(5-nitro-2-furyl)-benzimidazole (comparison substance) | | | >125 | >125 | >125 |

Due to their antimicrobial activity, the compounds of this invention are useful bacteria, fungus and yeast-inhibiting agents in both human and veterinary medicine. They can be employed, e.g., in the topical therapy of mycoses, in substantially the same manner as the known compound diamthazole dihydrochloride.

The compounds of this invention can be employed in mixture with conventional excipients, i.e., pharmaceutically acceptable organic or inorganic carrier substances suitable for parenteral, enteral or topical application which do not deleteriously react with the active compounds. Suitable pharmaceutically acceptable carriers include but are not limited to water, salt solutions, alcohols, vegetable oils, polyethylene glycols, gelatin, lactose, amylose, magnesium stearate, viscous paraffins, perfume oil, fatty acid monoglycerides and diglycerides, pentaerythritol fatty acid esters, hydroxy methylcellulose, polyvinyl pyrrolidone, talc. etc.

For topical application, these are employed, as nonsprayable forms, viscous to semi-solid or solid preparations comprising carrier material indigenous to topical formulations and having a dynamic viscosity preferably greater than water. Suitable formulations include but are not limited to solutions, suspensions, emulsions, creams, ointments, powders, liniments, salves, aerosols, etc. which are, if desired, sterilized or mixed with auxiliary agents, e.g., preservatives, stabilizers, wetting agents, buffers, or salts for influencing osmotic pressure, etc. For topical application, also suitable are sprayable aerosol preparations wherein the active ingredient, preferably in combination with a solid or liquid inert carrier material, is packaged in a squeeze bottle, or in a container in admixture with a pressurized volatile, normally gaseous propellant, e.g., a Freon. Usually, the active compounds of the invention are incorporated in topical formulations in a concentration of about 0.1 to 10 weight percent.

The compounds of this invention are generally administered to animals, including but not limited to mammals, e.g., humans, livestock, household pets, etc. A fungicidally effective daily dosage of the active compounds as administered topically generally comprises about 0.1 to 10, preferably 0.5 to 5 mg./cm.$^2$, of surface area. The dose can be administered singly or as divided dosages throughout the day.

Topical administration is preferred, the compounds of this invention being particularly valuable in the treatment of animals afflicted with tinea corporis, tinea pedis, tinea manuum or tinea inguinalis.

It will be appreciated that the actual preferred amounts of active compounds used will vary according to the specific compound being utilized, the particular compositions formulated, the mode of application, and the particular situs and organism being treated. Optimal application rates for a given set of conditions can be ascertained by those skilled in the art using conventional dosage determination tests in view of the above guidelines.

In addition to the use of these compounds for administration to mammals, they can be employed in admixture with carriers, emulsifiers, soaps, etc. for use as antiseptic solutions, e.g., in conjunction with hospital housekeeping procedures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees Celsius. Unless otherwise indicated, all percentages are by weight.

EXAMPLE 1

One gram of the ethyl ester of 5-nitrothiazole-2-carboximidic acid (J. Med. Chem. *12* [1969] 303) is refluxed for one hour with 540 mg. of o-phenylenediamine in 7.5 ml. of methanol with the addition of 0.4 ml. of methanol saturated with hydrogen chloride. The crystals are vacuum-filtered, thus obtaining 900 mg. of 2-(5-nitro-2-thiazolyl)-benzimidazole, m.p. 270–271° (after recrystallization from pyridine).

EXAMPLE 2

500 mg. of 5-nitrothiazole-2-aldehyde (J. Med. Chem., *12* [1969] 374) is refluxed with 342 mg. of o-phenylenediamine in ethanol for 20 hours under an air stream. After the reaction mixture has cooled, the thus-separated crystals are vacuum-filtered, thus obtaining 300 mg. of 2-(5-nitro-2-thiazolyl)-benzimidazole, m.p. 270–271° (after recrystallization from pyridine).

EXAMPLE 3

500 mg. of 5-nitrothiazole-2-aldehyde is heated with 342 mg. of o-phenylenediamine for 30 minutes in ethanol. After the solution has cooled, the thus-precipitated crystals are vacuum-filtered and agitated in 20 ml. of acetic acid with 1.4 g. of lead tetraacetate for 15 minutes at 60°. After cooling, 100 ml. of water is added to the reaction mixture and the thus-separated crystals are vacuum-filtered. After recrystallization from pyridine, 220 mg. of 2-(5-nitro-2-thiazolyl)-benzimidazole is produced, M.P. 270–271°.

EXAMPLE 4

From 7 g. of the ethyl ester of 5-nitrothiazole-2-carboximidic acid, 4.25 g. of 4-methyl-o-phenylenediamine, and 53 ml. of 1 N methanolic hydrochloric acid in 100 ml. of methanol, after 16 hours of agitation at room temperature, one obtains 3.34 g. of 2-(5-nitro-2-thiazolyl)-5-methylbenzimidazole, m.p. 232–233° (after recrystallization from dimethylformamide/methanol 1:5).

EXAMPLE 5

2 g. of the ethyl ester of 5-nitrothiazole-2-carboximidic acid is refluxed with 1.4 g. of 4,5-dimethyl-o-phenylenediamine and 10.7 ml. of 1.4 N methanolic hydrochloric acid in 30 ml. of methanol. Then, the mixture is poured into water, the crystals are vacuum-filtered, and the product is recrystallized from methanol with the addition of carbon, thus obtaining 202 mg. of 2-(5-nitro-2-thiazolyl)-5,6-dimethylbenzimidazole, m.p. 296–298°.

EXAMPLE 6

8 g. of the ethyl ester of 5-nitrothiazole-2-carboximidic acid and 5.65 g. of 4 - chloro-o-phenylenediamine are reacted analogously to Example 3, thus producing 2.1 g. of 2 - (5-nitro-2-thiazolyl)-5-chlorobenzimidazole, m.p. 238.5–239.5°.

EXAMPLE 7

1.2 g. of 5-nitrothiazole-2-carboximidic acid ethyl ester hydrochloride and 710 mg. of 4 - chloro-o-phenylenediamine are refluxed in 8 ml. of ethanol for 5 hours. Then, the reaction mixture is evaporated to dryness and the residue recrystallized from pyridine/water (1:1), thus obtaining 500 mg. of 2-(5-nitro-2-thiazolyl)-5-chlorobenzimidazole, m.p. 238–240°.

EXAMPLE 8

500 mg. of 2-cyano-5-nitrothiazole (J. Med. Chem., *12* [1969] 303) and 458 mg. of 4-chloro-o-phenylenediamine are dissolved in 3 ml. of absolute ether and allowed to stand for 20 hours at room temperature. The mixture is then refluxed for 20 hours, and the thus-produced 2-(5-nitro - 2-thiazolyl)-5-chlorobenzimidazole is vacuum-filtered (100 mg.).

EXAMPLE 9

2 g. of the ethyl ester of 5-nitrothiazole-2-carboximidic acid and 1.76 g. of 4,5-dichloro-o-phenylenediamine are allowed to stand with 30 ml. of methanol and with 7.15 ml. of 1.4 N methanolic hydrochloric acid for 21 hours at room temperature. The crystals are vacuum-filtered and recrystallized from dimethylformamide/water (1:1), thus producing 500 mg. of 2-(5-nitro-2-thiazolyl)-5,6-dichlorobenzimidazole. The compound decomposes above 300° without melting.

EXAMPLE 10

600 mg. of the ethyl ester of 5-nitrothiazole-2-carboximidic acid and 450 mg. of 4-methoxy-o-phenylenediamine are allowed to stand for 4 hours at room temperature with 10 ml. of methanol and 4.5 ml. of 1 N methanolic hydrochloric acid. Then, the crystals are vacuum-filtered, and, after recrystallization from methanol, 100 mg. of 2-(5-nitro-2-thiazolyl)-5-methoxybenzimidazole is obtained, m.p. 225–228°.

EXAMPLE 11

1.9 g. of the ethyl ester of 5-nitrothiazole-2-carboximidic acid and 1.8 g. of N-methyl-o-phenylenediamine hydrochloride are allowed to stand in 30 ml. of methanol at room temperature for 24 hours. Then, the reaction mixture is refluxed for 1 hour, concentrated by evaporation, and the residue dissolved in toluene and filtered over 10 g. of silica gel (deactivated with 3% water). The filtrate is evaporated and the residue recrystallized from ethanol/dimethylformamide (1:1), thus obtaining 75 mg. of 1-methyl - 2-(5-nitro-2-thiazolyl)-benzimidazole, m.p. 250–253°.

EXAMPLE 12

2 g. of the ethyl ester of 5-nitrothiazole-2-carboximidic acid and 1.5 g. of N-(2 - hydroxyethyl)-o-phenylenediamine are mixed with 50 ml. of methanol and 15 ml. of 1 N methanolic hydrochloric acid and refluxed for one hour. Then, the mixture is poured into water, the crystals are vacuum-filtered and purified by vacuum sublimation (200°/0.01 torr [mm. Hg]). The sublimate is recrystallized from dimethylformamide/methanol (1:1), thus producing 72 mg. of 1-(2-hydroxyethyl)-2-(5-nitro-2-thiazolyl)-benzimidazole, m.p. 232–237°.

EXAMPLE 13

One gram of the ethyl ester of 5-nitrothiazole-2-carboximidic acid and 1.1 g. of $N^1$-(2-hydroxyethyl)-4-trifluoromethyl-o-phenylenediamine are refluxed with 25 ml. of methanol and 7.5 ml. of 1 N methanolic hydrochloric acid for 2 hours. The crystals are vacuum-filtered, dissolved in ether, filtered, and the ether phase concentrated by evaporation. The remainder is recrystallized from dimethylformamide/water (1:1), resulting in 120 mg. of 1-(2-hydroxyethyl) - 2-(5-nitro-2-thiazolyl)-5(6)-trifluoromethylbenzimidazole, m.p. 215–222°. The two possible isomers were not separated.

EXAMPLE 14

500 mg. of the ethyl ester of 5-nitrothiazole-2-carboximidic acid and 710 mg. of N-(2-dimethylaminoethyl)-o-phenylenediamine trihydrochloride are refluxed in 5 ml. of ethanol for 3 hours. Then, the crystals are vacuum-filtered and recrystallized twice from water, thus producing 550 mg. of 1 - (2-dimethylaminoethyl)-2-(5-nitro-2-thiazolyl)-benzimidazole hydrochloride, which decomposes vigorously above 255° without melting.

EXAMPLE 15

2 g. of the ethyl ester of 5-nitrothiazole-2-carboximidic acid and 1.8 g. of 2-aminodiphenylamine refluxed for 1 hour in 50 ml. of methanol and 15 ml. of 1 N methanolic hydrochloric acid. Then, water is added to the reaction mixture, the crystals are vacuum-filtered and, after dissolution in ethanol, treated with carbon. The crystals remaining after the ethanol has been evaporated are recrystallized from pyridine/water (1:1) and from pyridine/ethanol (1:1), thus obtaining 220 mg. of 1-phenyl-2-(5-nitro-2-thiazolyl)-benzimidazole, m.p. 241–242°.

EXAMPLE 16

1.5 g. of the ethyl ester of 5-nitrothiazole-2-carboximidic acid and 1.6 g. of N-(2-phenylethyl)-o-phenylenediamine are allowed to stand with 25 ml. of methanol and 11.3 ml. of 1 N methanolic hydrochloric acid for 24 hours at room temperature. Then, the solution is concentrated by evaporation and the residue is filtered with toluene over 10 g. of silica gel (deactivated with 3% water). After the toluene fraction has been evaporated, the reaction mixture is recrystallized from ethanol, thus obtaining 70 mg. of 1-(2-phenylethyl)-2-(5-nitro-2-thiazolyl)-benzimidazole, m.p. 181–186°.

EXAMPLE 17

Ointment for external application having the following composition:

| | Percent |
|---|---|
| 2-(5-nitro-2-thiazolyl)-benzimidazole | 1.00 |
| Beeswax, white, D.A.B. (German Pharmacopoeia) 6 | 5.00 |
| Lanolin, anhydrous, D.A.B. 6 | 5.00 |
| Vaseline, white, D.A.B. 6 | 20.00 |
| Amphocerin K "Dehydag" | 25.00 |
| Paraffin, liquid, D.A.B. 6 | 13.98 |
| Water, desalinated | 30.00 |
| Chypre No. 6466, Haarmann & Reimer | 0.02 |

EXAMPLE 18

Ointment for external application having the following composition:

| | Percent |
|---|---|
| 2-(5-nitro-2-thiazolyl)-5-chlorobenzimidazole | 0.50 |
| Beeswax, white, D.A.B. 6 | 5.00 |
| Lanolin, anhydrous, D.A.B. 6 | 5.00 |
| Vaseline, white, D.A.B. 6 | 20.00 |
| Amphocerin K "Dehydag" | 25.00 |
| Paraffin, liquid, D.A.B. 6 | 14.48 |
| Water, desalinated | 30.00 |
| Chypre No. 6466, Haarmann & Reimer | 0.02 |

As the compounds of this invention in contrast to the known compound diamthazole dihydrochloride are effective against yeasts, e.g. *Candida albicans,* they are particularly useful for treating diseases caused by these germs.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 2-(5-nitro-2-thiazolyl)-benzimidazole of the formula

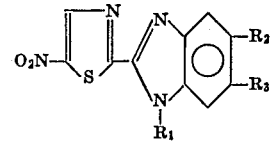

wherein $R_1$ is hydrogen; alkyl of 1–5 carbon atoms; phenyl; benzyl; 2-phenyl ethyl; hydroxyalkyl of 2–5 carbon atoms; hydroxyalkyl of 2–5 carbon atoms esterified with alkanoyl of 1–5 carbon atoms; or

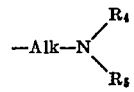

or salts thereof with physiologically compatible acids wherein Alk is alkylene of 2–5 carbon atoms and $R_4$ and $R_5$ are alkyl of 1–5 carbon atoms; and $R_2$ and $R_3$ are each hydrogen, halogen, alkyl of 1–5 carbon atoms, alkoxy of 1–5 carbon atoms, trifluoromethyl or nitro.

2. A compound according to claim 1 wherein at least one of $R_2$ and $R_3$ is hydrogen; chloride; alkyl of 1–5 carbon atoms; alkoxy of 1–5 carbon atoms; or trifluoromethyl.

3. A compound according to claim 2, wherein said alkyl of 1–5 carbon atoms is methyl and said alkoxy of 1–5 carbon atoms is methoxy.

4. A compound according to claim 1 wherein $R_1$ is hydrogen and at least one of $R_2$ and $R_3$ is hydrogen; chloride; alkyl of 1–5 carbon atoms; alkoxy of 1–5 carbon atoms; or trifluoromethyl.

5. A compound according to claim 4, wherein said alkyl of 1–5 carbon atoms is methyl and said alkoxy of 1–5 carbon atoms is methoxy.

6. A compound according to claim 1 wherein $R_1$ is hydrogen and $R_2$ and $R_3$ are each hydrogen, methyl, methoxy, or chloride.

7. A compound according to claim 1 wherein $R_1$ is hydrogen, alkyl of 1–5 carbon atoms; phenyl, benzyl, 2-phenylethyl, hydroxyalkyl of 2–5 carbon atoms; or

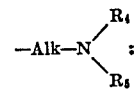

8. A compound according to claim 1 wherein $R_1$ is

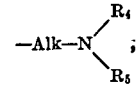

or the salts thereof with physiologically compatible acids.

9. A compound according to claim 1, 2-(5-nitro-2-thiazolyl)-benzimidazole.

10. A compound according to claim 1, 2-(5-nitro-2-thiazolyl)-5-methylbenzimidazole.

11. A compound according to claim 1, 2-(5-nitro-2-thiazolyl)-5,6-dimethylbenzimidazole.

12. A compound according to claim 1, 2-(5-nitro-2-thiazolyl)-5-chlorobenzimidazole.

13. A compound according to claim 1, 2-(5-nitro-2-thiazolyl)-5,6-dichlorobenzimidazole.

14. A compound according to claim 1, 2-(5-nitro-2-thiazolyl)-5-methoxybenzimidazole.

15. A compound according to claim 1, 1-methyl-2-(5-nitro-2-thiazolyl)-benzimidazole.

16. A compound according to claim 1, 1-(2-hydroxyethyl)-2-(5-nitro-2-thiazolyl)-benzimidazole.

17. A compound according to claim 1, 1-(2-hydroxyethyl)-2-(5-nitro-2-thiazolyl)-5-trifluoromethylbenzimidazole.

18. A compound according to claim 1, 1-(2-hydroxyethyl)-2-(5-nitro-2-thiazolyl)-6-trifluoromethylbenzimidazole.

19. A compound according to claim 1, 1-(2-dimethylaminoethyl)-2-(5-nitro-2-thiazolyl)-benzimidazole hydrochloride.

20. A compound according to claim 1, 1-phenyl-2-(5-nitro-2-thiazolyl)-benzimidazole.

21. A compound according to claim 1, 1-(2-phenylethyl)-2-(5-nitro-2-thiazolyl)-benzimidazole.

References Cited

UNITED STATES PATENTS 3,481,947   12/1969   Ennis _____ 260—302 H

RICHARD J. GALLAGHER, Primary Examiner

U.S. Cl. X.R.

424—270